Aug. 30, 1960  L. PÉRAS  2,950,940
AUTOMATIC GRAPPLE
Filed July 15, 1957  3 Sheets-Sheet 1

Aug. 30, 1960

L. PÉRAS 2,950,940

AUTOMATIC GRAPPLE

Filed July 15, 1957

Inventor
Lucien Peras
by Stevens, Davis, Miller & Mosher
his attorneys

2,950,940

AUTOMATIC GRAPPLE

Lucien Perás, Billancourt, France, assignor to Regie Nationale des Usines Renault, Billancourt, France, French works under control and authority of the French Government Filed July 15, 1957, Ser. No. 671,936

Claims priority, application France Aug. 22, 1956

7 Claims. (Cl. 294—110)

This invention relates in general to handling devices and more particularly to an automatic grapple adapted to be mounted on the end of a handling arm or lever so as to grip an object and to deposit it without shock and without any other assistance than the movement of the arm or lever relative to such object.

Essentially the present invention comprises a holder body having gripping members normally urged to an external position by spring means and adapted to retract within said body when contacting the object so as to grip the object upon completion of an approach stroke to which the handling arm or lever is subjected.

To permit the release of the object when desired, for example, after it has been transported from one place to another, the holder body is slidably mounted on a member contiguous with the handling arm or lever. The member is adapted, when the arm or lever accomplishes a stroke longer than the gripping stroke, to cause the gripping members to retract as the holder body engages or is pressed against the object or a stationary element, this retraction being attended by the locking of the holder body on the member.

During the backward movement of the device, the object is used to actuate the locking member in the reverse direction and permit, after the release of the gripping members, the return of the holder body to its normal position under the influence of adequate control members.

By utilizing only the movement of the handling arm or lever relative to the object for gripping or releasing the latter, the arrangement is particularly advantageous in that it makes it possible to dispense with the required costly mechanism provided in other known devices of this character for actuating the gripping members. In addition, as will become apparent as the following description proceeds, the construction of this device is particularly simple.

In order to afford a clearer understanding of this invention and to illustrate the manner in which the same may be carried out in the practice, reference will now be made to the accompanying drawings forming part of this specification and showing diagrammatically by way of example a typical embodiment of the improved handling holder according to this invention. In the drawings.

Figure 1:
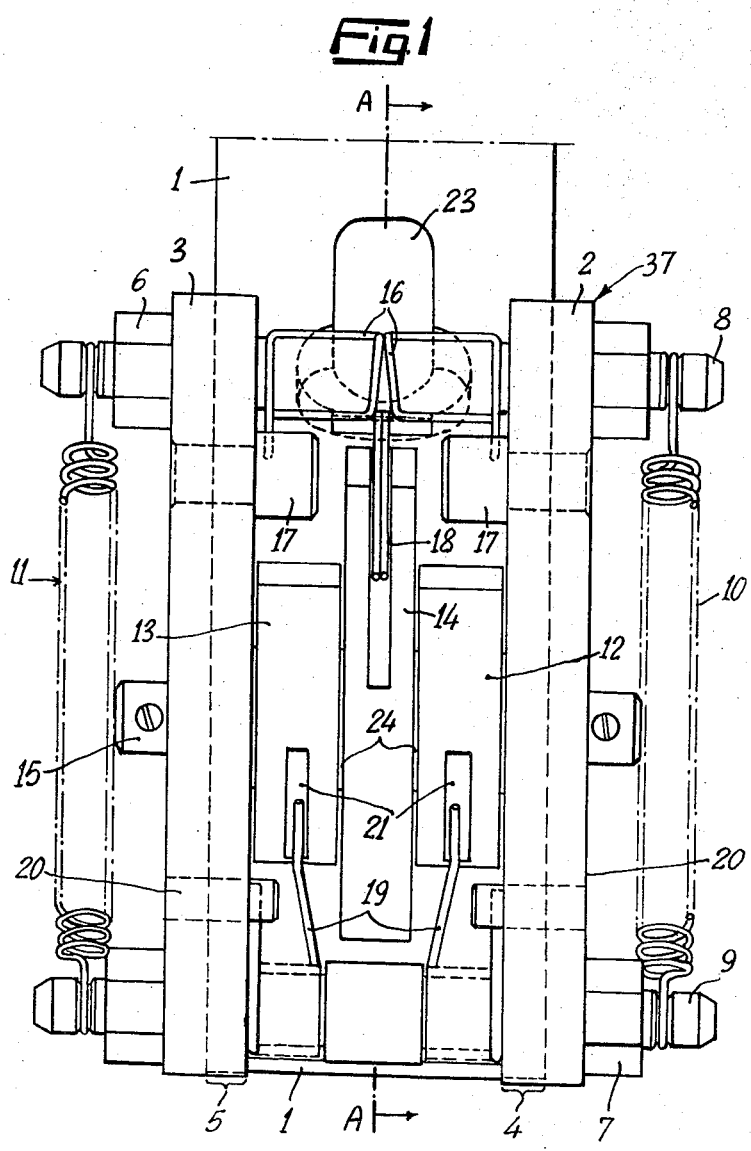
Figure 1 is an elevational view of the device.

As shown in the drawings, a holder body 37 is slidably mounted on a central member 1, which is rectangular in cross-section and is fixed on and carried by a handling arm or lever (not shown). The holder body 37 includes a pair of spaced apart parallel plates 2, 3 which have confronting faces. The plates 2, 3 are held in spaced relationship with each other by transverse tie rods 6, 7 and 8 that are disposed on one side adjacent the upper and lower ends of the plates and on the opposite side adjacent the upper ends of the plates. As can be seen, the holder body 37 straddles the central member 1 with the plates 2 and 3 having parallel projecting side portions which form the opposed side walls of guide grooves 4 and 5, the back wall of such grooves being defined by the adjoining side edge or face of the member 1.

The holder body 37 is constantly urged toward the outer or lower end of the member 1 by tension springs 10 and 11 anchored on a transverse shaft or pin 9 and on a tie rod 8, so that the plates 2, 3 are normally urged into contact with the shaft or pin 9 which is carried by the member 1 and which fits in the notches or shouldered bottom ends of the plates.

A pair of claws 12 and 13 adapted to grip the object to be held by means of the device and a claw locking member 14 are pivoted on a common shaft 15 carried by the parallel plates 2, 3 and extending transversely across the groove between the projecting side portions of the plates. The plates carry lateral shoulders 32 on their upper ends and, their opposite edges, which project appreciably beyond the side edges or face of the member 1, form grooves with the member 1. The claws are disposed in the grooves and mounted with the claw locking member 14 on the common shaft 15 with the claws or latches being mounted for common pivotal movement by virtue of the spring actuating means, as will be described, and with the locking member being interposed between the claws and being mounted for independent pivotal movement under the actuation of a spring means, as will be described.

A pair of spiral springs 16 are mounted on the upper tie rod 6 and bear at one end on studs 17 that are carried by the side plates 2, 3. The springs have their other ends engaged in a central notch 18 formed in the locking member 14 so as to cause the upper portion of this member to be urged against the central member 1 in the position of Figure 3.

Figure 2:
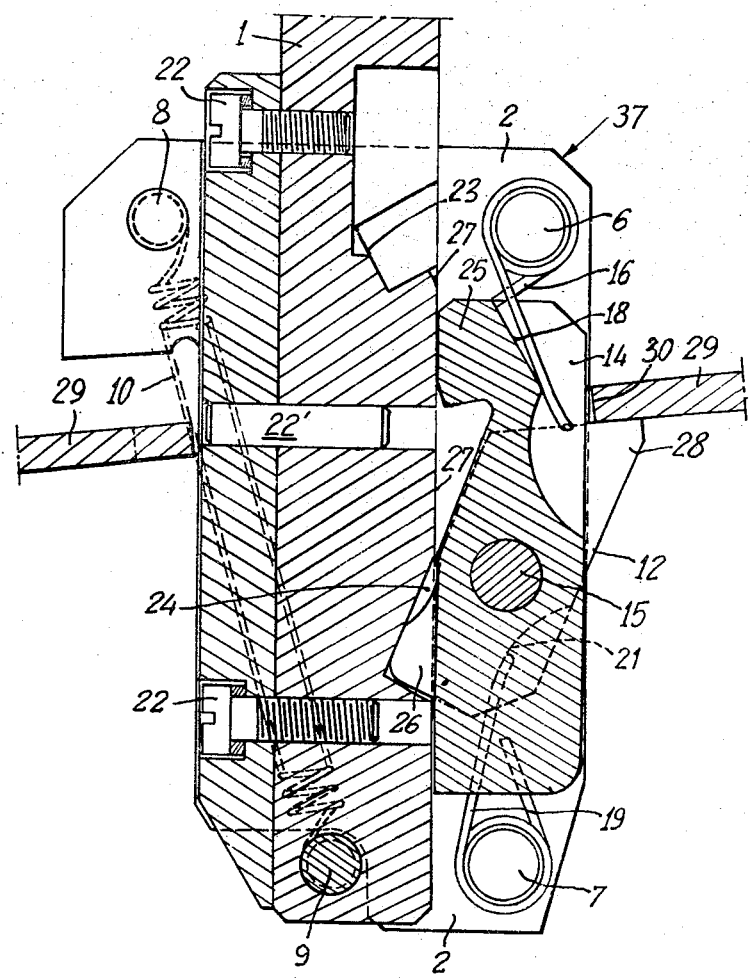
Figure 2 is a vertical section taken upon the line A—A of Fig. 1, the device being shown in its gripping position.

Similarly, another pair of spiral springs 19 are mounted on the tie rod 7 and bear at one end on the lower pair of studs 20 and engage, at their other end, in corresponding notches 21 formed in the claws 12 and 13 so that the lower portion of these claws is also urged against the central member 1 in the position of Figure 2.

As shown, the central member 1 consists of two parts assembled by means of screws 22 and positioned by a pin $22^1$ relative to each other. On the side registering with the gripping claws and the locking member, the central member 1 has a pair of notches 23 and 24 formed therein which are adapted to be engaged by the head 25 of the central locking member 14 and by the heel 26 of the gripping claws, respectively, according to the relative positions of the holder body and of the central member 1. The notches 24 are formed with an upwardly facing shoulder against which the underside of the heel 26 of the gripping claws abuts as shown in Figure 2, whereby the central member is locked to the plates and the catches 28 of the gripping claws are projected beyond the projecting side portions of the plates to extend so as to underlie the wall 29, as clearly shown in Figure 2. The notch 23 is shaped complemental to the head or hook end 25 of the locking member which is adapted to fit in the notch and lock the plates to the central locking member in the retracting or withdrawal position of the grapple as shown in Figure 3.

These notches 23 and 24 and the rectilinear guide face 27 formed therebetween are so disposed that in the normal position of the holder body, that is, in abutment with the transverse shaft 9 (Fig. 2), the catches 28 of the gripping claws project from the body, the central locking member 14 being retracted therein and lying in the groove.

Figure 3:
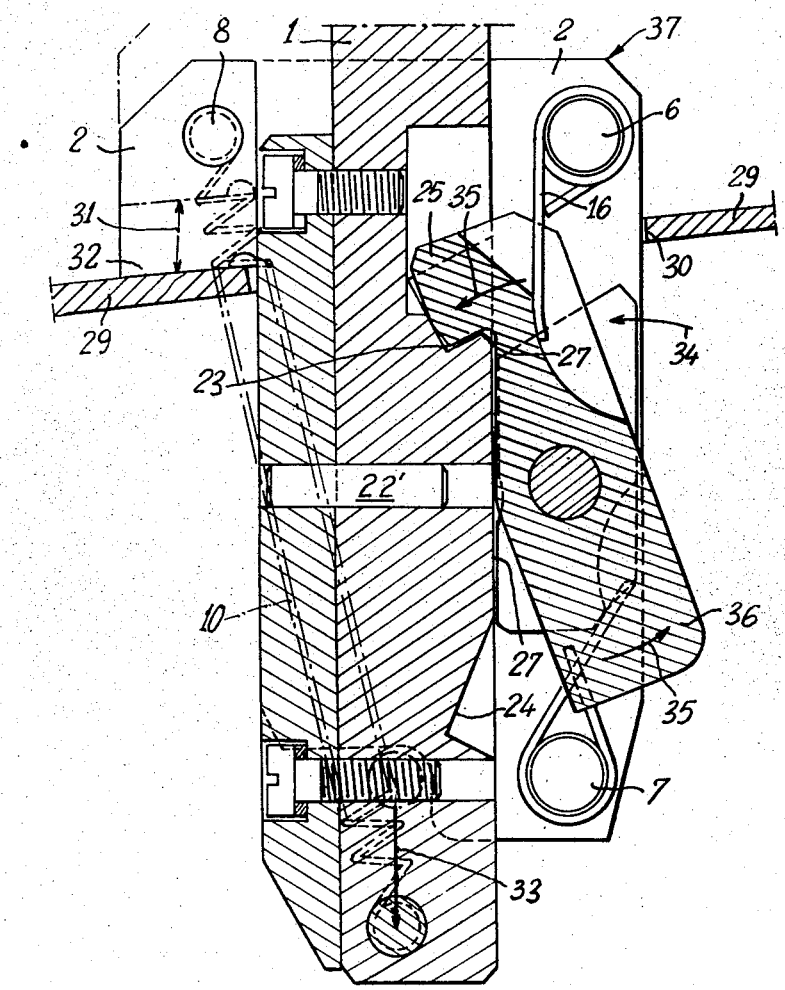
Figure 3 is a view similar to Fig. 2 showing the device in its releasing position.

The operation of the device described hereinabove is as follows:

When the handling arm or lever carrying the gripping device is lowered towards the object to be gripped (in this example a crankcase or the like box-shaped part of which only one fraction of a wall 29 is shown in Figs. 2 and 3 of the drawings), the holder body penetrates into the cavity through an adequate aperture thereof.

As the holder body moves past the wall 29, the claws 12 and 13 slide on the edge 30 of this wall and are pushed inward by pivoting about the pivot pin 15. Then, after the catches 28 have cleared this edge, they are again urged to their projecting position by the springs 19 (Fig. 2). It will be readily understood that by carefully determining and adjusting the downward movement or stroke of the handling arm, the latter will then be ready to lift the crankcase by meaans of the catches 28, so that the assembly may be transferred to another place.

To release the crankcase or like object at the new location, where it has been deposited by the arm, it is necessary to give the handling arm a downward movement or stroke with a greater amplitude than its gripping stroke.

The manner in which the object is released from the holder is illustrated in Fig. 3. This movement is obtained by temporarily retracting the claws 12 and 13 within the holder body.

As shown in Fig. 3, after the handling arm has accomplished an additional stroke portion of amplitude 31, the holder body engages with its shoulders 32, the wall 29 of the crankcase and is thus held against downward movement relative thereto.

Then, during another additional stroke portion of amplitude 33, the central member 1 slides within the holder body and pulls the tension springs 10 and 11. This movement of the central member 1, relative to the holder body, is so calculated that the guide face 27 will cause, on the one hand, the claws 12, 13 to be retracted by pivoting in the direction of the arrow 34, and, on the other hand, the head 25 of the locking member 14 to penetrate into the notch 23 (see arrow 35). Upon completion of these two simultaneous steps, the holder body 37 is locked relative to the member 1 and then the positions of the claws and of the locking member are such that the assembly can be withdrawn from the crankcase aperture. During this withdrawal, after the retracted catches 28 have cleared the wall 29 the heel 36 of locking member 14, which has been moved outwards beforehand in the direction of the arrow 35, will slide against the edge 30 of the aperture formed in the wall 29 and this edge will cause the heel 36 and, therefore, the locking member 14 to tilt in the opposite direction.

Consequently, the head 25 of this locking member is released from its notch 23 and the holder body is thus unlocked and urged to its normal position by the springs 10 and 11, restoring the plates 2 and 3 of the structure in their position of engagement with the transverse shaft 9 of the central member 1. The locking member 14, which has thus been withdrawn to a position in which it is flush with the guide face 27, remains retracted within the holder body while the claws 12 and 13 resume their projecting position. Under such condition, the device is ready to grip and hold another crankcase or like article in the manner described hereinabove.

From the foregoing, it will be readily understood that it is possible to construct a grappling device consisting of a plurality of devices of the type described hereinabove, which are adequately supported by a common handling arm and disposed as required by the arrangement of the apertures, projections or like holding or hooking means formed in the article to be transported, for example, even in the case of a solid article. As a matter of fact, it is also possible to form the bearing shoulder of the holder body on the same side as the gripping members.

It will be readily understood, on the other hand, that the single embodiment shown and described herein should not be construed as limiting the purpose of the present invention as many modifications and alterations may be brought thereto, regarding more particularly the relative arrangement, dimensions and shape of its component elements, without departing from the spirit and scope of the invention as set forth in the appended claims.

I claim:

1. An automatic grapple for automatically gripping an article having a ledge to which a lifting force can be applied from underneath in order to lift the article and transport it from one place to another and finally release the article by withdrawal of the grapple; said grapple comprising a central member, a holder body slidably mounted on the central member and guided thereby, first stop means provided between the central member and the holder body for locating the holder body and central member together in a fixed position, spring means urging said holder body and the central member into a position for engagement of the stop means, said central member having a side edge, said holder body having laterally spaced apart walls extending laterally beyond the side edge of the central member and forming therewith a groove, a pin transversely fixed between the walls intermediate the upper and lower ends thereof and disposed transversely of the groove, a locking member pivoted on the pin, a pair of catches disposed on either side of said locking member and pivoted on the pin, said side edge of the central member being formed with an upper notch and a pair of lower notches which are spaced vertically below the upper notch, said catches having upper and lower ends, spring means acting on the catches so as to normally urge them jointly to a position in which the upper ends of the catches project laterally beyond the outer edges of the walls and underlie the ledge so as to secure the holder body to the article, said catches in such position having their lower ends seated in the pair of lower notches so as to lock the central member to the article in such position whereby an upward thrust on the central member results in the lifting of the article, said central member being movable downwardly into a lowered position so as to force the catches out of the lower pair of notches and dispose the catches in a retracted position lying within the groove inwardly of the side edges of the walls, second stop means carried by the holder body engageable with the outer surface of the wall portion of the article so as to locate the holder body against downward movement upon such downward thrust of the central member relative to the located holder body, said locking member having an upper end which when the central member is in such lowered position is in alignment with the upper notch so as to be fixed in the upper notch to lock the holder body and central member together for common upward movement in the withdrawal movement of the grapple, spring means acting on the locking member so as to normally urge the upper end into the position in which the upper end is seated in the notch with the locking member having a lower end that in such position protrudes beyond the outer edges of the walls and is adapted to be engaged by the ledge upon the withdrawal movement of the grapple so as to unlock the holder and the central member and permit downward sliding movement of the holder body relative to the central member so as to dispose the holder body and central member in a locked position with the stop means being active to locate them together and dispose the catches in an outwardly projecting position with their upper ends projecting outwardly laterally beyond the side edges of the walls.

2. A grapple as claimed in claim 1 wherein said holder body includes a pair of plates disposed on opposite sides of the central member, transverse connections securing the plates together and said plates having outer edge portions constituting the walls of the holder body.

3. A grapple as claimed in claim 2, wherein said first stop means includes a pin carried by the lower end of the central member and having laterally extending ends on which the lower ends of the plates engage.

4. A grapple as claimed in claim 3, wherein said spring means urging said holder body and the central member in a position for engagement of the first stop means includes coil springs connected between said pin and one of the transverse connections at the upper ends of the plates.

5. A grapple as claimed in claim 2, wherein said second stop means includes laterally offset shoulder on the upper ends of the plates.

6. A grapple as claimed in claim 2, wherein said central member has an upper end provided with an axial prolongation constituting an operating lever.

7. A grapple as claimed in claim 2, wherein said spring means acting on the locking member and on the catches includes springs coiled on the transverse connections and having ends bearing against the outer sides of the locking member and the catches.

References Cited in the file of this patent
UNITED STATES PATENTS

| | | |
|---|---|---|
| 2,584,124 | Gustafson | Feb. 5, 1952 |
| 2,701,736 | Heppenstall | Feb. 8, 1955 |